Oct. 27, 1959 B. L. STURGIS Re. 24,729

LAWN EDGER

Original Filed April 10, 1956 2 Sheets-Sheet 1

INVENTOR
BERNARD L. STURGIS

BY John Y. Phillips
ATTORNEY

Oct. 27, 1959 B. L. STURGIS Re. 24,729
LAWN EDGER
Original Filed April 10, 1956 2 Sheets-Sheet 2
FIG. 4.
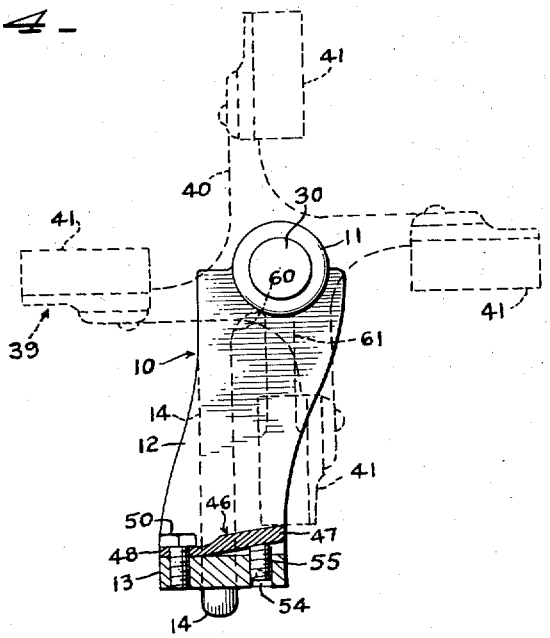
FIG. 6.
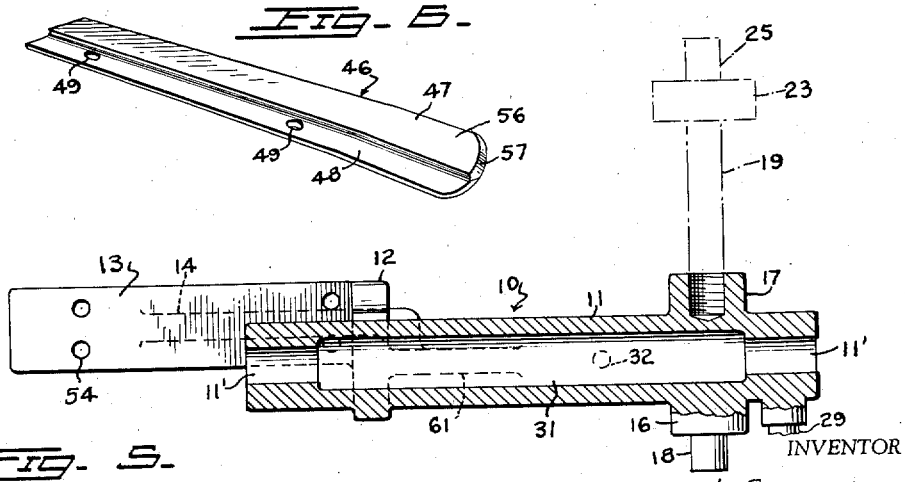
FIG. 5.
INVENTOR
BERNARD L. STURGIS
BY John F. Phillips
ATTORNEY United States Patent Office Re. 24,729
Reissued Oct. 27, 1959

24,729

LAWN EDGER

Bernard L. Sturgis, Norfolk, Va., assignor to Ottcraft Products, Incorporated, Norfolk, Va., a corporation of Virginia Original No. 2,805,537, dated September 10, 1957, Serial No. 577,359, April 10, 1956. Application for reissue January 20, 1959, Serial No. 788,026

8 Claims. (Cl. 56—249)

Matter enclosed in heavy brackets [ ] appears in the original patent but forms no part of this reissue specification; matter printed in italics indicates the additions made by reissue.

This invention relates to a lawn edger.

It has been proposed to provide lawn edgers having stationary blades or ledger bars projecting forwardly in the direction of movement of the device over a concrete walk or the like, and over which rotates a reel carrying cutting blades, cooperating with the stationary blades to shear grass overhanging the edge of the sidewalk. The reel of such device is so arranged that its axis lies in a perpendicular plane parallel to the edge of the sidewalk when the device is in operation. The device is supported by a wheel carrying a bevel gear meshing with a pinion carried by the shaft to which the reel is attached so that the operator, walking behind the wheel and pushing the device with a handle connected to the device, will rotate the wheel and thus effect rotation of the blades of the reel.

Such devices have been found to be highly efficient in operation and are objectionable primarily because of the cost of manufacture. Such cost necessitates a retail price which many people are unwilling to pay. Moreover, in such prior devices, adjustment of the stationary blade takes place by swinging such blade about a fixed axis parallel to the axis of rotation of the reel. Since such an adjustment cannot compensate for uneven wearing of the stationary blade, more frequent grinding of such blade is necessary for accurate adjustment.

An important object of the present invention is to provide a novel lawn edger of the type referred to above wherein the entire supporting structure of the device is formed as a single unitary casting, thus materially reducing the cost of manufacture of the device.

A further object is to provide such a device wherein the unitary body or supporting structure of the device forms bearings for the reel shaft and a support for the stationary blade, and carries means for the attachment of the shaft for the supporting wheel, thus greatly simplifying the structure as a whole.

A further object is to provide a lawn edger of the type described having a novel simplified means for adjusting the stationary blade relative to the reel.

A further object is to provide such an adjustment means wherein oposite end portions of the stationary blade are separately adjustable to compensate for uneven wearing of the blade, thus making it necessary less frequently to grind or true the stationary blade.

A further object is to provide a novel lawn edger of this character wherein the stationary blade forms also the pick-up finger for moving upwardly to cutting position grass which overhangs the edge of the walk.

A further object is to provide a stationary blade which possesses an inherent degree of flexibility transversely thereof to facilitate the use of adjusting screws directly contacting a free edge of the stationary blade adjacent the reel to adjust the blade and reel relative to each other.

Other objects and advantages of the invention will become apparent during the course of the following description.

In the drawings I have shown one embodiment of the invention. In this showing:

Fig. 4 is a section on line 4—4 of Fig. 1, parts being omitted and the reel being shown in dotted lines;

Fig. 5 is a sectional view through the unitary support, taken on line 5—5 of Fig. 1, the wheel supporting shaft and positioning collar being shown in broken lines; and Fig. 6 is a detail perspective view of the stationary blade.

Figure 1:
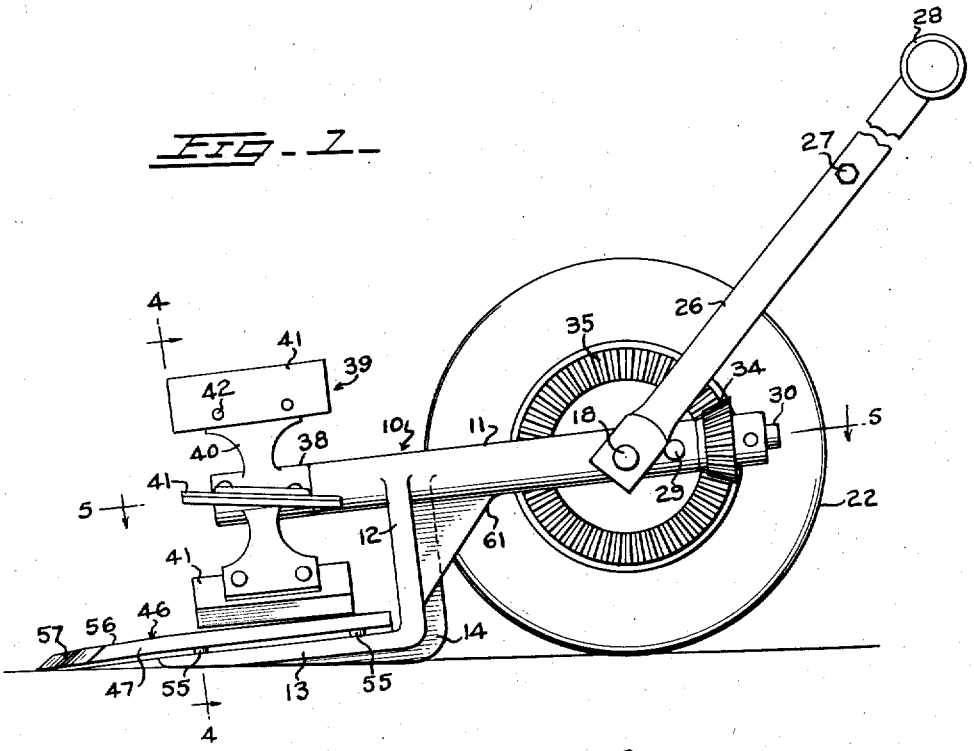
Fig. 1 is a side elevation of the device, a portion of the handle being broken away.
Figure 2:
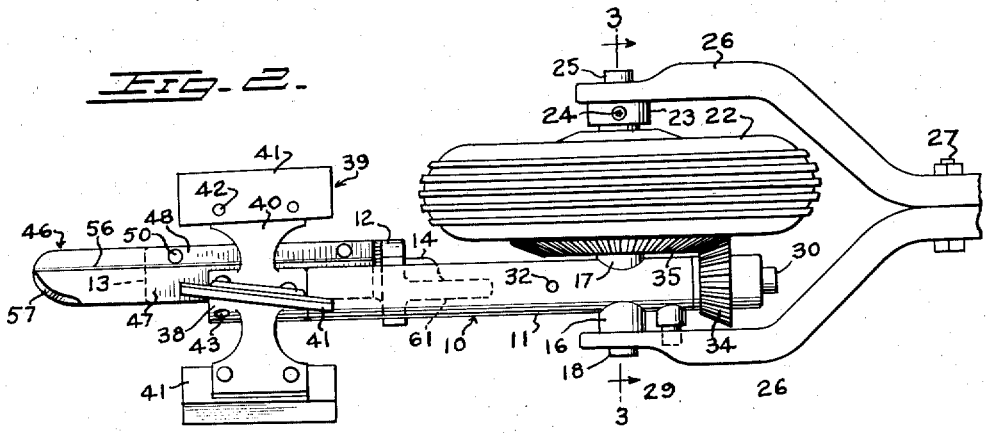
Fig. 2 is a plan view of the same.
Figure 3:
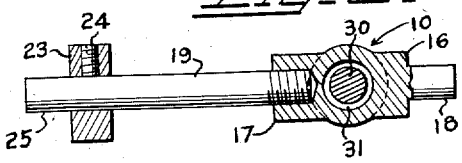
Fig. 3 is an enlarged sectional view on line 3—3 of Fig. 2, the wheel, gears and handle being omitted.

Referring to the drawings, the numeral 10 designates the integral body or supporting structure of the device as a whole. The body of the device is formed as a single casting, preferably of an aluminum alloy of substantial hardness. The body 10 comprises an elongated substantially cylindrical side frame member 11 open throughout its length as shown in Fig. 5 and provided in its ends with bored and polished bearings 11' to receive the shaft of the device, referred to below.

Formed integral with the side frame member 11 is a depending wall 12 the forward profile of which is clearly shown in Fig. 4. At the lower end of this wall projects an integral forwardly extending flat-topped foot portion 13. Rearwardly of the wall 12 and beneath the foot portion 13 is formed an integral reinforcing rib 14 which adequately strengthens the connection between the wall 12 and portion 13.

At a point spaced from the rear end thereof, the side frame member 11 is provided at opposite sides (Fig. 5) with horizontally projecting bosses 16 and 17 the former of which is provided with a projecting integral stud 18 for a purpose to be described. An axle 19 has its inner end threaded into the boss 17 or otherwise fixed thereto.

A supporting wheel 22 is mounted to rotate on the axle 19 and is placed in position thereon from the end of the axle opposite the support 10. The wheel is maintained in position by a collar 23 which may be secured in position by a setscrew 24, preferably of the Allen type. The end of the axle opposite the body 10 projects beyond the collar 23 as at 25 to act as a stud substantially identical with the stud 18. The two studs 18 and 25 rotatably receive the lower forward ends of handle members 26 which converge rearwardly of the wheel 22 and are bolted together as at 27. The upper ends of the handle members 26 preferably turn outwardly and terminate in hand grips 28 the specific form of which is unimportant in the present invention. The side frame member 11 is provided with a projecting stud 29 to limit downward rearward movement of the handle structure.

A shaft 30 projects through the tubular side frame member 11 the inside of which is enlarged between the bearings 11' to form a lubricant space 31, and the top of the frame member 11 is provided with an opening 32 into which is preferably secured a lubricant fitting (not shown) for supplying lubricant to the space 31.

The rear end of the shaft 30 carries a bevel pinion 34 meshing with a bevel gear 35 carried by the wheel 22. It will be apparent that rolling movement of the wheel 22 over the surface of a walk rotates the shaft 30 through gear 35 and pinion 34.

The shaft 30 projects beyond the forward bearing 11' and has secured thereon the hub 38 of a reel indicated as a whole by the numeral 39. The hub 38 is provided with spider arms 40 to the outer ends of which are secured blades 41 riveted or otherwise secured to the spiders 40 as at 42. The hub 38 may be secured to the shaft 30 in any suitable manner, for example by a set screw 43. It will be obvious that the pinion 34 will be similarly secured to the shaft 30, and that the hubs of the pinion 34 and reel 39 prevent endwise movement of the shaft 30 in its bearings 11'.

A stationary blade 46 is arranged above the foot portion 13 of the frame 11. The stationary blade, together with the foot portions 13, is offset to the left of the vertical plane of the axis of the shaft 30 looking from the front of the device as in Fig. 4, so that the cutting edge portion 47 of the stationary blade lies directly beneath the axis of the shaft 30. Such cutting edge portion of the stationary blade is relatively thick, as clearly shown in Figs. 4 and 6, and the blade is formed of spring steel. The opposite edge portion of the blade 46, indicated by the numeral 48, is relatively thin and is provided with openings 49 through which extend screws 50 for securing the edge portion 48 of the stationary blade to the foot portion 13.

Substantially beneath the forward and rear limits of the blades 41, the foot portion 13 is provided with threaded openings 54 in which are arranged Allen screws 55 having their sockets at the lower ends thereof. The upper ends of the screws 55 engage against the bottom surface of the thicker portion of the stationary blade, as shown in Fig. 4.

The stationary blade 46 has an end portion 56 projecting substantially forwardly of the forward extremity of the foot portion 13 and sloping slightly downwardly. The forward extremity of the extended blade portion 56 is curved and chamfered as at 57 to serve as a pick-up finger for grass overlying the sidewalk.

As previously stated, the reinforcing rib 14 extends along the bottom of the foot portion 13 and the rib is arranged substantially centrally of such foot portion. In view of the offsetting of the foot portion 13 relative to the shaft 20, it will be apparent that the rib 14, in order that it may be arranged in a single plane to absorb upward thrusts on the foot portion 13, will project upwardly to one side of the side frame member 11, as shown in dotted lines in Fig. 4. This rib portion at its upper end has its inner surface curved inwardly as at 60 (Fig. 4) to form a thickened filleted portion integrally joining the side frame member 11 to increase the strength of the rib 14. To provide additional strength in the angle between the side frame member 11 and wall 12, such members are connected by an integral gusset rib 61. Accordingly, the entire depending and forwardly extending portion of the body 10 possesses a high degree of strength and rigidity.

OPERATION

The device is placed in position along the left-hand edge of a concrete or similar walk, namely, the near edge as viewed in Fig. 1. The device is placed in position with the right-hand edge of the foot portion 13, as viewed in Fig. 4, substantially in vertical alinement with the edge of the walk. The operator will then propel the device forwardly or to the left in Fig. 1 with the forward end of the stationary blade sliding over the walk. The chamfered edge 57 lifts grass overhanging the edge of the walk and supports such grass for rearward movement in upstanding position along the edge of the thickened portion 47 of the stationary blade, thus positioning all of the overhanging grass to be cut by the blades 41.

As the device is rolled along the walk in the manner stated, the wheel 22 drives the reel 39 through gear 35, pinion 34 and shaft 30. The reel will be rotated in a clockwise direction as viewed in Fig. 4, and the grass held upright to the right of the stationary blade 46 in Fig. 4 will be sheared off by rotation of the blades 41. The device cuts the grass with a surprisingly straight even edge and thus materially improves the appearance of the walk.

It will be noted that the body 10 of the present device is formed as an integral casting, including the foot portion 13. In prior constructions, such foot portion is not employed, and the rear end of the stationary blade is bent upwardly along a wall corresponding to the wall 12 and is provided with means associated with such wall for rocking the stationary blade to adjust it relative to the reel blades. It is not necessary to bend the stationary blade in the present construction, and the inadequate stationary blade rocking means is not employed. Such rocking adjustment in prior constructions takes place about a fixed axis parallel to the axis of the drive shaft and rotates the stationary blade bodily. This may result in a proper blade adjustment at one end of the reel blades without proper adjustment at the other ends of the reel blades due to uneven wearing of the stationary blade or reel blades. The present construction provides a simplified and far more accurate adjustment of the blades relative to each other. The stationary blade is bent in manufacture substantially as shown in Fig. 4 except that in its original shape, there will be a clearance between the reel blades and the shearing edge of the stationary blade.

In adjusting the present construction, an Allen wrench is applied to one of the screws 55 to move the adjacent portion of the thicker side of the stationary blade upwardly to provide a proper relationship with the reel blades. Similar adjustment is performed by rotating the other screw 55, and accordingly an exact adjustment of the stationary blade relative to the reel blades can be obtained. Subsequent adjustments may be made equally easily. The inherent stiffness of the blade 46 maintains the bottom of the portion 47 thereof in tight engagement with the screws 55, and accordingly only these screws need be turned and no setscrews need be operated to fix the parts in adjusted positions. It has been found that the device will remain in adjustment until wearing of the blades requires readjusting of the parts.

The stationary blade 46 in the present device constitutes not only the stationary blade but also the pick-up finger and forms in itself a part of the adjusting means since it is directly engaged from beneath by the screws 55. It will be obvious that if a clearance occurs at either end of the reel blades and not at the other end, previous adjusting means would be inadequate for securing proper adjustment, and grinding of the blades would be required. Such clearance at one end readily may be taken up with the present construction by slightly rotating the corresponding screw 55.

The cost of manufacture of the present device is substantially reduced over prior devices of a similar nature. Accordingly, substantial sales resistance is removed and the device is made available to a larger number of purchasers. Moreover, it is pointed out that such simplification in construction and economy in manufacture is not accompanied by any sacrifice in efficiency. The device operates with just as high a degree of efficiency as any prior device of this nature and, in addition, is advantageous because of the simplified means employed for adjusting the stationary blade.

It is to be understood that the form of the invention shown and described is to be taken as a preferred example of the same and that various changes in the shape, size and arrangement of the parts may be made as do not depart from the spirit of the invention or the scope of the appended claims.

I claim:

1. In a lawn mower, a frame, a foot bar carried by said frame, said foot bar being elongated and rigid, an elongated stationary blade arranged over said foot bar and fixed along one longitudinal edge portion to one longitudinal edge portion of said foot bar, the other longitudinal edge of said blade being a cutting edge, and spaced screws passing upwardly through said foot bar adjacent the other longitudinal edge thereof and engaging against the bottom of said blade to flex the other longitudinal edge portion thereof upwardly away from said foot bar.

2. In a lawn mower, a frame, a foot bar carried by said frame, said foot bar being elongated and rigid, an elongated stationary blade arranged over said foot bar and fixed along one longitudinal edge portion to one longitudinal edge portion of said foot bar, the other longitudinal edge of said blade being a cutting edge, said one edge portion of said blade being relatively thin throughout its length to provide such edge portion of said blade with a substantial degree of resiliency, the other edge portion of said blade being relatively thick and rigid, and adjusting screws threaded through the other longitudinal edge portion of said foot bar and engaging against the bottom of the other longitudinal edge portion of said blade.

3. In a lawn mower, a frame, a foot bar carried by said frame, said foot bar being elongated and rigid, an elongated stationary blade arranged over said foot bar, a plurality of screws having heads at their upper ends engaging against the top of one longitudinal edge portion of said stationary blade, said screws passing through said stationary blade and being threaded into said one longitudinal edge portion of said foot bar, the other longitudinal edge of said stationary blade being a cutting edge, and adjusting screws passing upwardly through the other longitudinal edge portion of said foot bar and engaging against the bottom of the other longitudinal edge portion of said stationary blade.

4. A lawn mower according to claim 3 wherein said one longitudinal edge portion of said blade is relatively thin substantially throughout its length to provide such portion of said blade with a substantial degree of resiliency, said other longitudinal edge portion of said blade being relatively thick and rigid.

5. In a lawn mower, a frame, a foot bar carried by said frame, said foot bar being elongated and rigid, an elongated stationary blade arranged over said foot bar, a plurality of screws having heads at their upper ends engaging against the top of one longitudinal edge portion of said stationary blade, said screws passing through said stationary blade and being threaded into said one longitudinal edge portion of said foot bar, the other longitudinal edge of said stationary blade being a cutting edge, a reel having blades mounted to rotate on an axis parallel to said cutting edge of said stationary blade, the blades of said reel being of equal length and having their opposite ends terminating in parallel planes perpendicular to said cutting edge, and a pair of adjusting screws threaded upwardly through the other longitudinal edge portion of said foot bar and having their upper ends engaging against the bottom surfaces of said stationary blade, each screw being arranged substantially in one of said parallel planes.

*6. In a lawn mower, a frame, a foot bar carried by said frame, said foot bar being elongated and rigid, an elongated stationary blade arranged over said foot bar and fixed along one longitudinal edge portion to one longitudinal edge portion of said foot bar, the other longitudinal edge of said blade being a cutting edge, and adjustable means passing upwardly through said foot bar adjacent the other longitudinal edge thereof and engaging against the bottom of said blade to flex the other longitudinal edge portion thereof upwardly away from said foot bar.*

*7. In a lawn mower, a frame, a foot bar carried by said frame, said foot bar being elongated and rigid, an elongated stationary blade arranged over said foot bar and fixed along one longitudinal edge portion to one longitudinal edge portion of said foot bar, the other longitudinal edge of said blade being a cutting edge, and screw means passing upwardly through said foot bar adjacent the other longitudinal edge thereof and engaging against the bottom of said blade to flex the other longitudinal edge portion thereof upwardly away from said foot bar.*

*8. In a lawn mower, a frame, a foot bar carried by said frame, said foot bar being elongated and rigid, an elongated stationary blade arranged over said foot bar, a plurality of screws having heads at their upper ends engaging against the top of one longitudinal edge portion of said stationary blade, said screws passing through said stationary blade and being threaded into said one longitudinal edge portion of said foot bar, the other longitudinal edge of said stationary blade being a cutting edge, and at least one adjusting screw passing upwardly through the other longitudinal edge portion of said foot bar and engaging against the bottom of the other longitudinal edge portion of said stationary blade.*

References Cited in the file of this patent or the original patent

UNITED STATES PATENTS

| | | |
|---|---|---|
| 2,093,413 | Brosted | Sept. 21, 1937 |
| 2,490,169 | Swahnberg | Dec. 6, 1949 |
| 2,490,170 | Swahnberg | Dec. 6, 1949 |
| 2,709,883 | Pascucci | June 7, 1955 |
| 2,782,587 | Ott | Feb. 26, 1957 |